(12) United States Patent
Sabripour

(10) Patent No.: US 10,521,704 B2
(45) Date of Patent: Dec. 31, 2019

(54) METHOD AND APPARATUS FOR DISTRIBUTED EDGE LEARNING

(71) Applicant: MOTOROLA SOLUTIONS, INC., Chicago, IL (US)

(72) Inventor: Shervin Sabripour, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 135 days.

(21) Appl. No.: 15/824,389

(22) Filed: Nov. 28, 2017

(65) Prior Publication Data
US 2019/0164020 A1 May 30, 2019

(51) Int. Cl.
*G06K 9/66* (2006.01)
*G06K 9/00* (2006.01)
(Continued)

(52) U.S. Cl.
CPC ........... *G06K 9/66* (2013.01); *G06K 9/00228* (2013.01); *G06K 9/00369* (2013.01); *G06K 9/4628* (2013.01); *G06N 20/00* (2019.01)

(58) Field of Classification Search
CPC .. G06K 9/66; G06K 9/00664; G06K 9/00671; G06K 9/6267; G06N 20/00;
(Continued)

(56) References Cited

U.S. PATENT DOCUMENTS 7,526,101 B2   4/2009   Avidan
8,331,674 B2   12/2012  Feris et al.
(Continued)

FOREIGN PATENT DOCUMENTS

CN   107153871    9/2017
EP   2645297      10/2013
KR   2011004706   1/2011

OTHER PUBLICATIONS

PCT/US2018/061776 International Search Report and Written Opinion of the International Searching Authority dated Feb. 11, 2019 (18 pages).

(Continued)

*Primary Examiner* — Dwayne D Bost
*Assistant Examiner* — Stephen M Brinich
(74) *Attorney, Agent, or Firm* — Michael Best & Friedrich LLP

(57) ABSTRACT

A portable electronic device and method. The portable electronic device includes a first camera, a second camera, an electronic processor, and one or more sensors. The electronic processor is configured to detect, based on information obtained from the one or more sensors, an incident and select a camera responsive to the incident. The electronic processor is further configured to capture an image using the selected camera and determine, within the image, a subject of interest, wherein the subject of interest is at least one selected from the group consisting of a person, an object, and an entity. The electronic processor is also configured to initiate an edge learning process on the subject of interest to create a classifier for use in identifying the subject of interest and transmit the classifier to a second portable electronic device within a predetermined distance from the portable electronic device.

20 Claims, 7 Drawing Sheets

(51) Int. Cl.
*G06K 9/46* (2006.01)
*G06N 20/00* (2019.01)

(58) Field of Classification Search
CPC ...... G06N 20/10; G06N 20/20; H04N 5/2258; H04N 5/2257; H04N 5/2259; H04N 5/232
USPC .......................................... 382/155–160, 181
See application file for complete search history.

(56) References Cited

U.S. PATENT DOCUMENTS

| | | | |
|---|---|---|---|
| 8,649,594 | B1 | 2/2014 | Hua et al. |
| 10,055,961 | B1* | 8/2018 | Johnson ............... G08B 29/186 |
| 10,083,233 | B2* | 9/2018 | Kontschieder ........ G06F 16/783 |
| 2005/0190059 | A1 | 9/2005 | Wehrenberg |
| 2006/0018516 | A1* | 1/2006 | Masoud ............. G06K 9/00342 382/115 |
| 2008/0297587 | A1* | 12/2008 | Kurtz ................. G06K 9/00335 348/14.08 |
| 2010/0134625 | A1* | 6/2010 | Bobbitt .............. G06K 9/00711 348/150 |
| 2017/0192401 | A1 | 7/2017 | Wexler et al. |
| 2019/0042896 | A1 | 2/2019 | Sabripour |

OTHER PUBLICATIONS

Sabripour, "Edge Intelligence Demo Video," youtube, published on Sep. 18, 2016, https://www.youtube.com/match?v=qzHm5BgGfm8.
AGT International, "Advanced Object Tracking," website (first published on the Internet Jan. 30, 2016) (https://www.agtinternational.com/analytics/iot-analytics/advanced-object-tracking/.

* cited by examiner

METHOD AND APPARATUS FOR DISTRIBUTED EDGE LEARNING

BACKGROUND OF THE INVENTION

Public safety personnel increasingly use image capture devices while performing their duties. Image capture devices include, for example, a body worn camera, a camera-equipped unmanned aerial vehicle (a "UAV" or drone) or a vehicle-mounted device such as an in-vehicle dash camera. The increased presence of such devices enables automated object detection, for example, using artificial neural networks (referred to as "neural networks" hereafter). Neural networks may learn to recognize or identify an object by processing streams of data received from the image capture devices. In some instances, a public safety personnel possessing such an image capture device may not be able to activate the camera in time to capture or identify one or more of an important subject.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
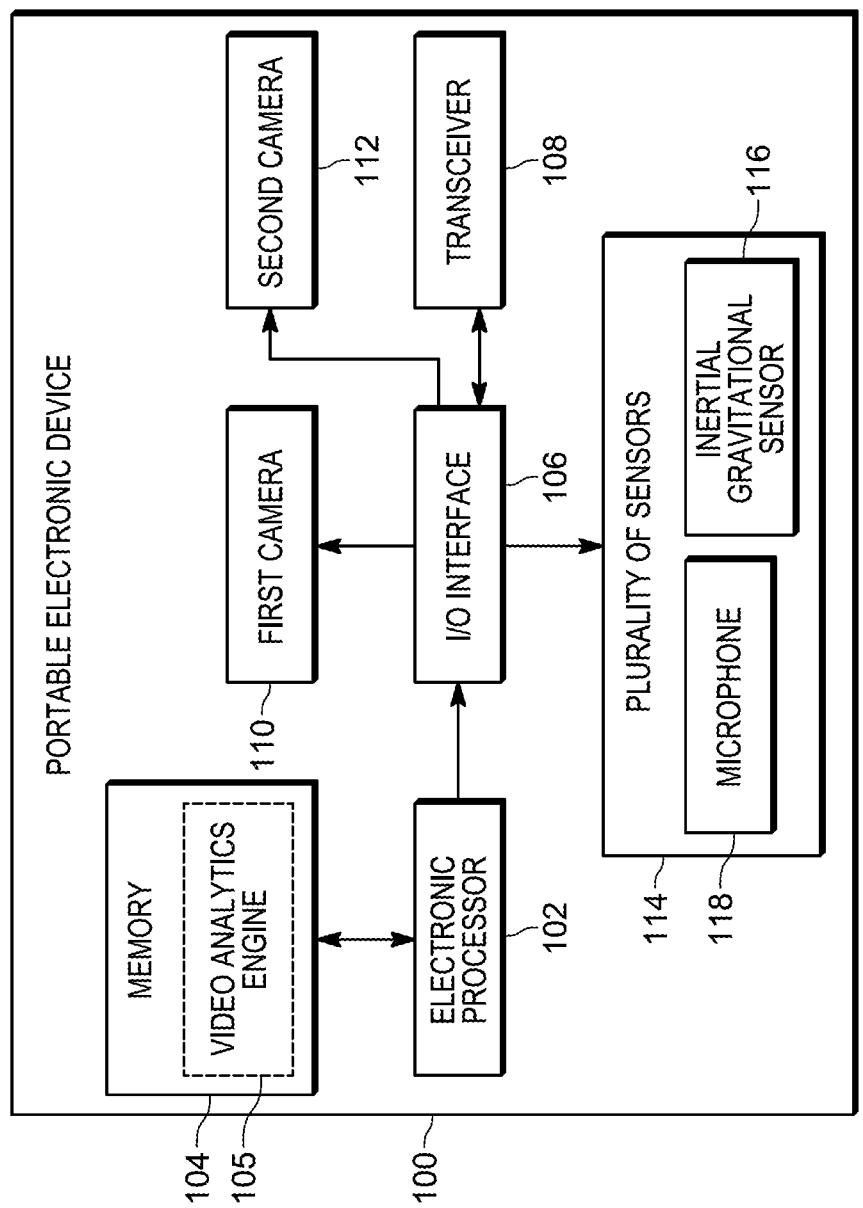
FIG. 1 is a diagram of a portable electronic device in accordance with some embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some image capture or recognition devices implement real-time identification using analytic engines (for example, a video analytic engine), which utilize classifiers, neural networks, and the like to detect and identify objects. Machine learning generally refers to the ability of a computer program to learn how to operate without being explicitly programmed how to operate. In some embodiments, a computer program (for example, a learning engine) is configured to construct a model (for example, one or more algorithms) based on example inputs. Supervised learning involves presenting a computer program with example inputs and their desired (for example, actual) outputs. The computer program is configured to learn a general rule (for example, a model) that maps the inputs to the outputs. The computer program may be configured to perform machine learning using various types of methods and mechanisms. For example, the computer program may perform machine learning using decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using all of these approaches, a computer program may ingest, parse, and understand data and progressively refine models for data analytics.

Neural networks create classifiers for automated object detection. In machine learning and statistics, classification is the problem of identifying to which of a set of categories (sub-populations) a new observation belongs, on the basis of a training set of data containing observations (or instances) whose category membership is known. The classifiers' effectiveness may be limited by the quality or quantity of training data provided for them. Training data on an object from one vantage point limits the accuracy of the detection engine, regardless of the learning process used. Modern image capture devices often include relative powerful computers capable of performing video analytics. Edge learning leverages this distributed processing power to perform some object detection and classifier training on the network edge while the rest of the learning process may be performed on a different device, server, and/or system.

Quick and accurate identification of an object of interest can improve outcomes for public safety patrol and response efforts. In some instances, personnel possessing an electronic object learning device (for example, a body-worn camera) may not be able to activate the camera for object recognition in time. This may be due to an incident (for example, an unexpected struggle or removal of the camera from the personnel) caused by an adversary. Accordingly, embodiments described herein provide, among other things, an edge learning electronic device and method for automatic edge learning activation.

One example embodiment provides a portable electronic device. The portable electronic device includes a first camera, a second camera, an electronic processor, and one or more sensors. The electronic processor is configured to detect, based on information obtained from the one or more sensors, an incident and select a camera responsive to the incident. The electronic processor is further configured to capture an image using the selected camera and determine, within the image, a subject of interest, wherein the subject of interest is at least one selected from the group consisting of a person, an object, and an entity. The electronic processor is also configured to initiate an edge learning process on the subject of interest to create a classifier for use in identifying the subject of interest and transmit the classifier to a second portable electronic device within a predetermined distance from the portable electronic device.

Another example embodiment provides an edge learning method for a portable electronic device. The method includes detecting, based on information obtained from one or more sensors, an incident and selecting, between a first camera and a second camera, a camera responsive to the incident. The method also includes capturing an image using the selected camera and determining a subject of interest within the image, wherein the subject of interest is at least one selected from the group consisting of a person, an object, and an entity. The method further includes initiating an edge learning process on the subject of interest to create a classifier for use in identifying the subject of interest and transmitting the classifier to a second portable electronic device within a predetermined distance from the portable electronic device.

For ease of description, some or all of the example systems presented herein are illustrated with a single example of each of its component parts. Some examples may not describe or illustrate all components of the systems. Other example embodiments may include more or fewer of each of the illustrated components, may combine some components, or may include additional or alternative components.

FIG. 1 is a diagram of a portable electronic device 100 in accordance with some embodiments. The portable electronic device 100 is an object learning device in accordance with some embodiments. In the example illustrated, the portable electronic device 100 includes an electronic processor 102, a memory 104, an input and output (I/O) interface 106, a transceiver 108, a first camera 110, a second camera 112, and a plurality of sensors 114. In some embodiments, the plurality of sensors 114 includes an inertial gravitational sensor 116 and/or a microphone 118. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. The portable electronic device 100 is presented as an example that may be programmed and configured to carry out the functions described herein.

In some embodiments, the portable electronic device 100 may be a handheld device or a wearable device. For example, the portable electronic device 100 may be a portable communication device, such as, for example a portable two-way radio including a camera, a body-worn camera, a smart telephone, a tablet computer, and the like. In some embodiments, components of the portable electronic device 100 may be separately implemented, and may be communicatively coupled by a bus or by a suitable communication network. For example, the portable electronic device 100 may include a network-connected portable computer or similar device in proximity to the portable electronic device 100. Similarly, the microphone 118 may be part of another device outside the portable electronic device 100. It should be understood that, in other constructions, the portable electronic device 100 includes additional, fewer, or different components than those illustrated in FIG. 1.

The electronic processor 102 obtains and provides information (for example, from the memory 104, the transceiver 108, and/or the devices coupled to the I/O interface 106) and processes the information by executing one or more software instructions or modules, capable of being stored, for example, in a random access memory ("RAM") area of the memory 104, a read only memory ("ROM") of the memory 104, or another non-transitory computer readable medium (not shown). The software can include firmware, one or more applications, program data, filters, rules, one or more program modules, and other executable instructions. The electronic processor 102 is configured to retrieve from the memory 104 and execute, among other things, software related to the control processes and methods described herein.

The memory 104 can include one or more non-transitory computer-readable media, and includes a program storage area and a data storage area. The program storage area and the data storage area can include combinations of different types of memory, as described herein. The memory 104 may take the form of any non-transitory computer-readable medium. In the embodiment illustrated, the memory 104 stores, among other things, a video analytics engine 105. The video analytics engine 105 analyzes video (and other media) to, among other things, identify and detect objects, shapes, motion, and the like within the video. In some embodiments, the video analytics engine 105 is configured to execute at least part of an object learning process (called edge learning). As described below in regard to FIG. 2, the portable electronic device 100 implements the edge learning process to create a classifier for identifying a subject of interest. In some embodiments, the video analytics engine 105 includes other features for object detection and video analysis, for example, gesture recognition.

In the example discussed, the subject of interest is a distinguishable being or inanimate object. Specifically, the subject of interest is a person, object, or entity of interest (POE). The video analytics engine 105 is configured to learn the subject of interest based one or more physical or, in the case of a being, anatomical features determined from a view captured by the cameras 110 and/or 112. For example, when the subject of interest is a human being, the features of the target detected by the video analytics engine 105 may be one or more of a facial feature, a voice or vocal feature, a height, a hair color, a skin tone, a tattoo, a birthmark, an eye color, a body shape, a gait, a feature of a wearable article (for example, jewelry, a clothing color, clothing pattern, or a logo), or another physical feature, with which the person can reasonably be identified. The wearable article may be an article of clothing or a wearable accessory (for example, a piece of jewelry, a hat or headpiece, a bag, a purse, or a backpack) on the target. When the subject of interest is an object or entity, (for example, a vehicle) physical features may include a color, pattern, or other defining physical features.

The I/O interface 106 operates to receive input from, for example, a user of the portable electronic device 100, to provide system output, or a combination of both. The I/O interface 106 obtains information and signals from, and provides information and signals to, (for example, over one or more wired and/or wireless connections) devices both within and outside the electronic computing system. Input may be provided via, for example, a keypad, additional microphones, soft keys, icons, soft buttons, a scroll ball, buttons, and the like. System output may be provided via a visual and/or audio output (for example, a display screen). The display screen may be a suitable display device such as, for example, a liquid crystal display (LCD) touch screen, or an organic light-emitting diode (OLED) touch screen. The I/O interface 106 may include a graphical user interface (GUI) (for example, generated by the electronic processor 102, from instructions and data stored in the memory 104 and/or, in some embodiments, received from a remote server and presented on the display screen) that enables a user to interact with the portable electronic device 100. In alternative embodiments, the I/O interface 106 includes a push-to-talk (PTT) button for activating a two-way radio modem (not shown), which button may be implemented, for example, as a physical switch or by using a soft key or icon in the graphical user interface on the display screen.

The transceiver 108 is configured for wireless coupling to wireless networks (for example, land mobile radio (LMR) networks, Long Term Evolution (LTE) networks, Global System for Mobile Communications (or Groupe Special Mobile (GSM)) networks, Code Division Multiple Access (CDMA) networks, Evolution-Data Optimized (EV-DO) networks, Enhanced Data Rates for GSM Evolution (EDGE) networks, 3G networks, 4G networks, combinations or derivatives thereof, and other suitable networks, including future-developed networks. Alternatively, or in addition, the portable electronic device 100 may include a connector or port (not shown) for receiving a connection to a wired network (for example, Ethernet). The electronic processor 102 is configured to operate the transceiver 108 to receive input from and to provide system output, or a combination of both. The transceiver 108 obtains information and signals from, and provides information and signals to, (for example, over one or more wired and/or wireless connections) devices both internal and external to the portable electronic device 100.

The cameras 110 and 112 are each a device, for example a video sensor or a camera, designed or configured to capture an image or series of images within a field of view. The camera 110, 112 (when the respective camera is active) communicate the captured media to the electronic processor 102. In the context of the camera 110, 112, the term "media" may refer to one or more digital images or video captured by the camera 110, 112 or processed by the electronic processor 102. Although illustrated in FIG. 1 as being located within the portable electronic device 100, either or both cameras 110 and 112 may be located outside of the portable electronic device 100. The cameras 110 and 112 are each positioned on different sides of the portable electronic device 100. For example, in some embodiments, the first camera 110 is positioned on a front side of the portable electronic device 100 and the second camera 112 is positioned on a back side of the portable electronic device 100.

The plurality of sensors 114 include one or more additional sensors included within the portable electronic device 100. As mentioned previously, in some embodiments the plurality of sensors 114 includes the inertial gravitational sensor 116. The inertial gravitational sensor 116 is a sensor configured to detect/measure a movement of the portable electronic device 100. The inertial gravitational sensor 116 may be a one or a combination of an accelerometer, gyroscope, a magnetometer, and the like. As explained in more detail below, the inertial gravitational sensor 116 detects an incident based on particular measurements of movement with respect to the portable electronic device 100. In some embodiments, the plurality of sensors 114 also includes an audio sensor or microphone 118. The microphone 118 is configured to capture audio signals/samples proximate to the portable electronic device 100. As explained in more detail below, the microphone 118 may be used to capture an audio sample corresponding to an incident.

Figure 2:
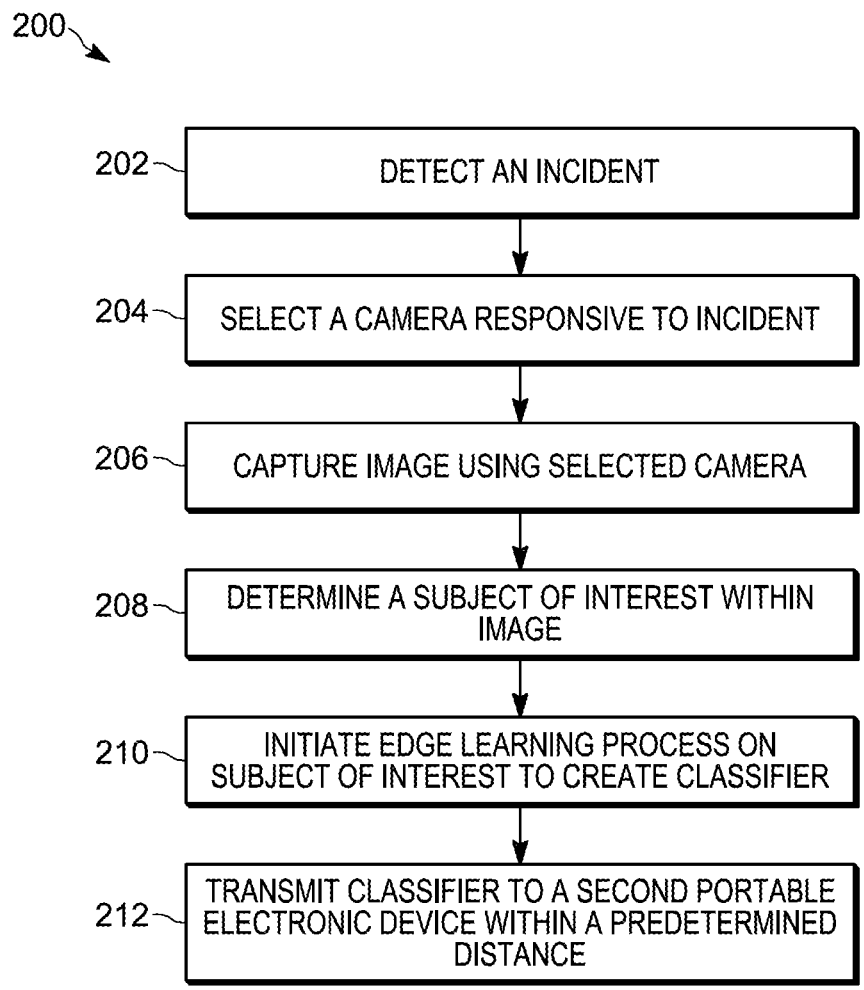
FIG. 2 is a flowchart illustrating an object learning method implemented by the portable electronic device of FIG. 1 in accordance with some embodiments.

FIG. 2 illustrates a method 200 of object learning performed by the portable electronic device 100. As an example, the method 200 is described as being performed by the electronic processor 102.

Figure 3A:
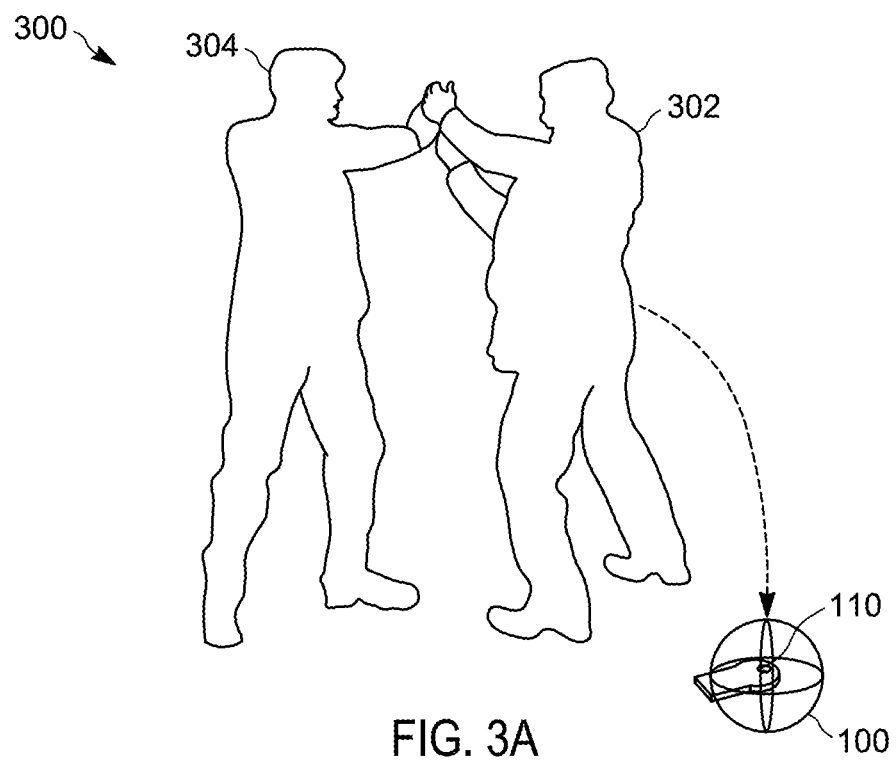
FIG. 3A illustrates an example incident including the portable electronic device of FIG. 1 according to some embodiments.
Figure 3B:
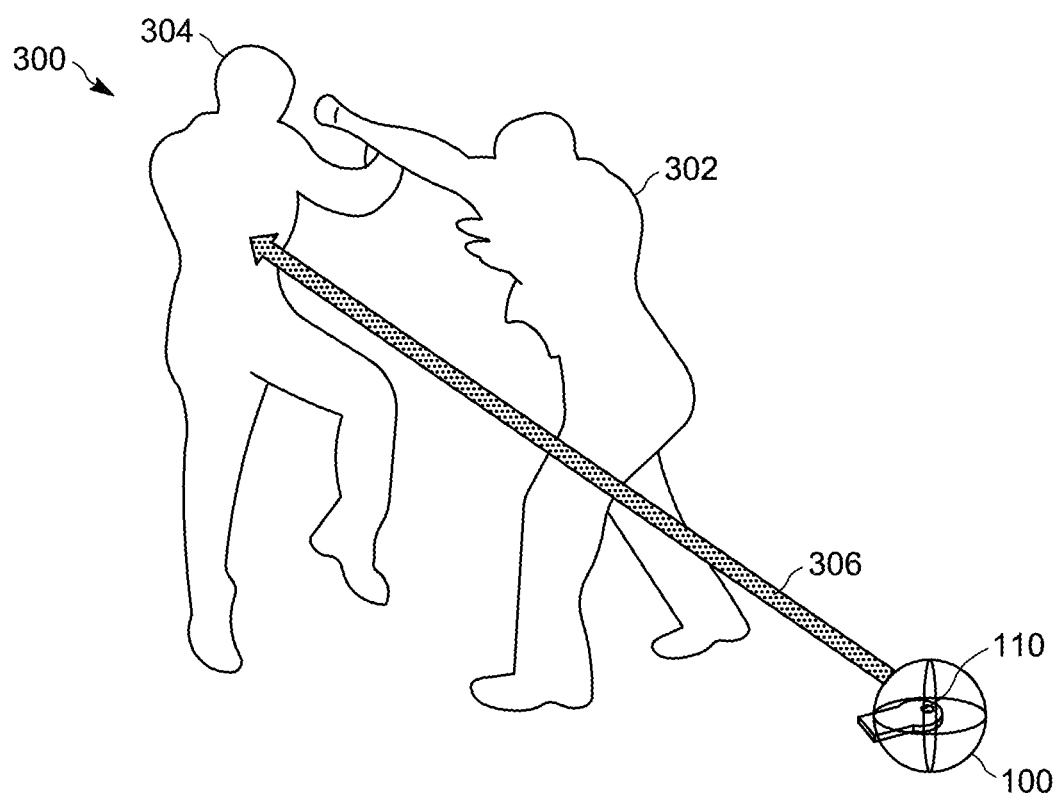
FIG. 3B illustrates an example incident including the portable electronic device of FIG. 1 according to some embodiments.

At block 202, the electronic processor 102 detects, based on information obtained from the one or more sensors 114, an incident. An incident is an unexpected and/or involuntary removal of the portable electronic device 100 from the possession of a user of the device 100 caused by a second party or object. The incident may include removing the portable electronic device 100 from a holster of the user, dropping the portable electronic device 100 from a predetermined height, and throwing the portable electronic device 100. In some embodiments, an incident may also be when the user of the portable electronic device 100 is being chased, where the portable electronic device 100 may or may not be dropped. In some embodiments, the incident may be when the user is struck by a vehicle. The electronic processor 102 may detect a motion indicative of a sudden movement based on a signal generated by and received from the inertial gravitational sensor 116. Specifically, the signal may be processed by the electronic processor 102 to determine whether the sudden movement is indicative of an incident. For example, FIGS. 3A and 3B illustrate an incident 300 between a user 302 of the portable electronic device 100 and a second party 304. In the illustrated example, the incident 300 is detected when the portable electronic device 100 is unexpectedly thrown or dropped from the user 302 due to, for example a force delivered to the user 302 by the second party 304.

In some circumstances, a sudden movement may not be indicative of an incident (for example, the portable electronic device 100 is intentionally removed or accidently dropped by the user). The electronic processor 102 may be configured to differentiate between an incident and an accidental triggering or detection of an incident. The electronic processor 102 may do this, for example, by analyzing and processing one or more signals from one or more of the plurality of sensors 114 and the cameras 110, 112. For example, the electronic processor 102 may analyze a signal from the inertial gravitational sensor 116 to determine a particular pattern in acceleration and/or jerk and determines an incident when the signal exceeds a predetermined threshold. The electronic processor 102 may also analyze an audio signal captured by the microphone 118 to detect one or more particular words or commands from the user of the portable electronic device 100 suggesting that the movement is not indicative of an incident (for example, when the user accidently drops the device and exclaims "oops"). In some embodiments, the electronic processor 102 may be able to determine a height in which the portable electronic device 100 is dropped based on a signal from the inertial gravitational sensor 116 and compare the calculated height to the predetermined height.

Figure 4A:
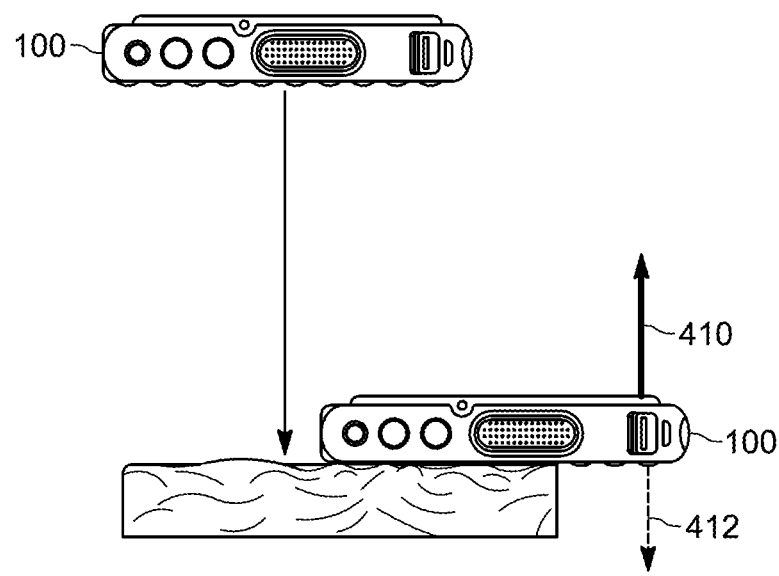
FIG. 4A illustrates an example drop incident of the portable electronic device of FIG. 1 according to some embodiments.

Returning to FIG. 2, at block 204, the electronic processor 102 selects, between the first camera 110 and the second camera 112, a camera responsive to the incident. Specifically, the electronic processor 102 determines, between the first camera 110 and the second camera 112, which camera is able to capture the incident. In some incidents, at least one of the cameras 110, 112 may not be able to capture information regarding the incident. For example, when the incident 300 includes the portable electronic device 100 being dropped, it may be the case that the device 100 is in a position such that one of the cameras 110 or 112 is pointing away from one or more key elements of the incident 300. For example, FIG. 4A illustrates a case where the portable electronic device 100 is dropped. In the illustrated example, the first camera 110 is aimed pointing out one side of the device 100 (indicated by an arrow 410) while the second camera 112 is aimed pointing out towards the opposite side of the device 100 (indicated by a second arrow 412). Because the device 100 is resting horizontally on its side, the second camera 112 is aimed towards the ground and thus cannot capture the incident. The electronic processor 102 may determine that the second camera 112 is unable to capture the incident based on information from one or more of the plurality of sensors 114 and/or by analyzing a captured image from the second camera 112. Thus, the electronic processor 102 may select the first camera 110.

Figure 4B:
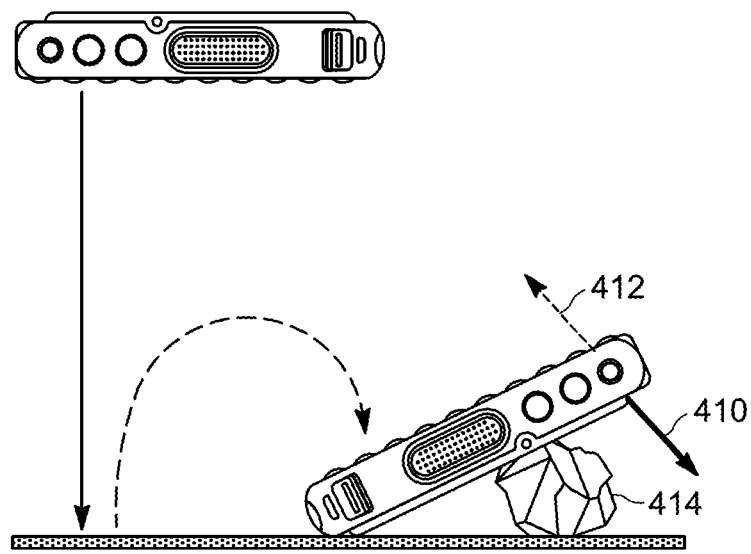
FIG. 4B illustrates an example drop incident of the portable electronic device of FIG. 1 according to some embodiments.

In some cases when the incident includes the portable electronic device 100 being dropped (or thrown), the portable electronic device 100 may bounce upon making contact with a surface. For example, FIG. 4B illustrates a case where the portable electronic device 100 bounces upon being dropped. The electronic processor 102 may determine that the device 100 dropped and bounced based on information from the inertial gravitational sensor 116 and/or one or more of the plurality of sensors 114 (for example, an accelerometer) and may detect that the drop corresponds to an incident. In some embodiments, when the incident includes the portable electronic device 100 being dropped, the portable electronic device 100 may fall onto uneven terrain and may not lie horizontally straight. For example, in the case illustrated in FIG. 4B, the device 100 lands at an angle from the ground due to an object 414. The electronic processor 102 may determine which camera to select by determining which of the first camera 110 and the second camera 112 is angled in a substantially upward direction. For example, in the case illustrated in FIG. 4B, the second camera 112 (whose aim is indicated by the arrow 412) is angled more upward in comparison to the first camera 110 (whose aim is indicated by the arrow 410). The electronic processor 102 may determine the camera by determining an orientation of the portable electronic device 100 based on a signal from the inertial gravitational sensor 116. The electronic processor 102 may select the camera responsive to the incident based on the motion indicative of the sudden movement based on signal received from the inertial gravitational sensor 116. In some embodiments, the electronic processor 102 determines the camera by analyzing and comparing the images captured by each of the cameras 110 and 112 to determine which camera is capturing an active scene (a scene where the objects within are moving).

In FIG. 3B, the portable electronic device 100 is positioned such that the first camera 110 is facing upward (indicated by an arrow 306) while the second camera 112 (not shown) is facing downward. In this position, the first camera 110 is able to capture at least part of the incident 300 while the second camera 112 is unable to capture any part of the incident 300. Thus, the first camera 110 may be selected by the electronic processor 102.

Returning to FIG. 2, at block 206 the electronic processor 102 captures an image using the selected camera and, at block 208, determines, within the image, a subject of interest. The subject of interest may be a cause of the determined incident. As mentioned above, the subject of interest may be at least one selected from the group consisting of a person, an object, and an entity. In the example incident 300 illustrated in FIGS. 3A and 3B, the subject of interest is the second party 304.

Returning to FIG. 2, at block 210 the electronic processor 102 initiates an edge learning process on the subject of interest to create a classifier for use in identifying the subject of interest. The classifier may be used with machine learning to iteratively process images of the subject of interest and classify the subject of interest. For example, at block 212, the electronic processor 102 transmits the classifier to a second portable electronic device within a predetermined distance from the portable electronic device 100. The receiving device or system may then use the classifier to recognize (or classify) the subject of interest.

While at block 210, the electronic processor 102 continues implementing the edge learning process until the subject of interest is no longer present in the field of vision of the selected camera, after a predetermined time period has passed, or when the edge learning process exceeds a minimum learning threshold. The subject of interest may no longer present in the field of vision of the selected camera, for example, because the subject has left the incident. In this case, a partially complete classifier may be transmitted to the second portable electronic device and/or a remote system for further processing. When the partially complete classifier is transmitted to a second portable electronic device and/or a remote system, the second portable device/remote system may include or be in communication with a database of one or more profiles, wherein each profile includes a corresponding classifier of a particular person, object, or entity of interest. The second portable electronic device and/or remote system may compare the partially complete classifier to the one or more classifiers included in the database to determine a matching profile. When a matching profile is determined, the portable electronic device/remote system may transmit the matching profile corresponding to the partially completed classifier to the portable electronic device 100. When a matching profile is not determined, the partially complete classifier may be stored in the database as a partially complete profile. The minimum learning threshold may be a set threshold when data determined by the learning process begins to converge (for example, the data "learned" about the subject of interest is becoming redundant). In some embodiments, the electronic processor 102 is further configured to determine if the determined subject of interest is a public safety personnel or user of the portable electronic device 100. In such an embodiment, when the electronic processor 102 determines that the subject of interest is a public safety personnel and/or the user, the electronic processor 102 terminates the edge learning process being performed on the public safety personnel and/or user.

It should be understood that although the method 200 is described in terms of a single subject of interest, in some embodiments the portable electronic device 100 may be configured to execute the method 200 on multiple subjects of interest, consecutively or simultaneously. For example, in some embodiments, the electronic processor 102 is further configured to determine, within the image captured at block 206, a second subject of interest, initiate a second edge learning process on the second subject of interest to create a second classifier, and transmit the second classifier to the second portable electronic device within the predetermined distance from the portable electronic device 100.

Figure 5:
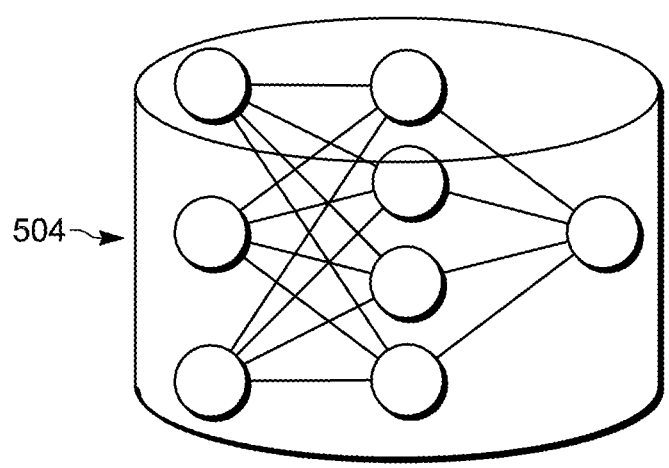
FIG. 5 illustrates types of information captured by the portable electronic device of FIG. 1 during an incident according to some embodiments.
Figure 5:
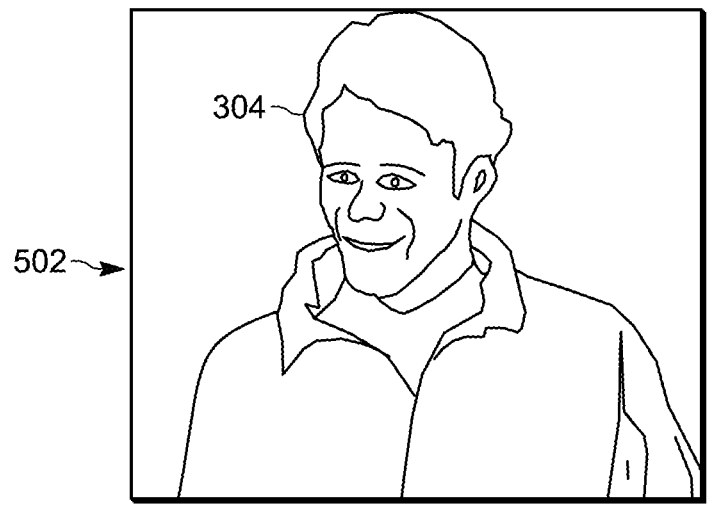
Figure 5:
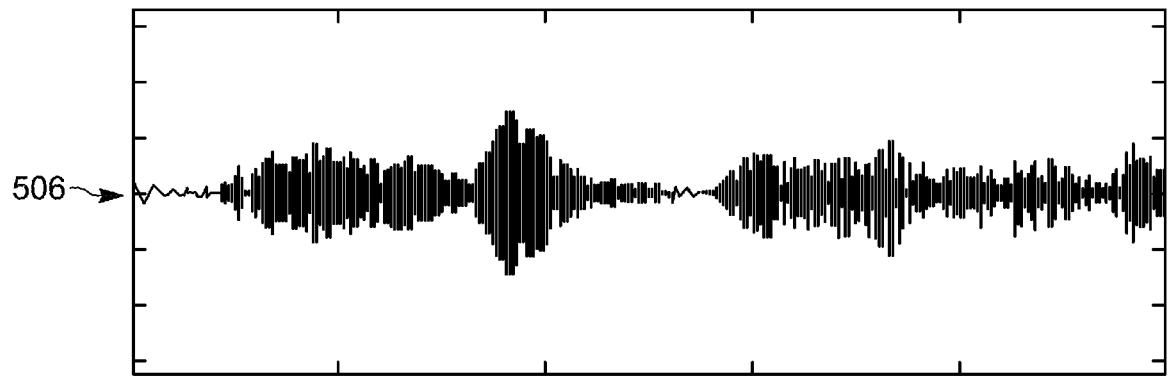

FIG. 5 illustrates the types of information that may be captured by the portable electronic device 100 at blocks 206, 208, and 210 of the method 200. The device 100 captures an image 502 of the subject of interest (in this case, the second party 304) and creates, using an edge learning process, a classifier 504 of the subject of interest. In some embodiments, the device 100 may also capture an audio sample 506 of the subject of interest.

Figure 6:
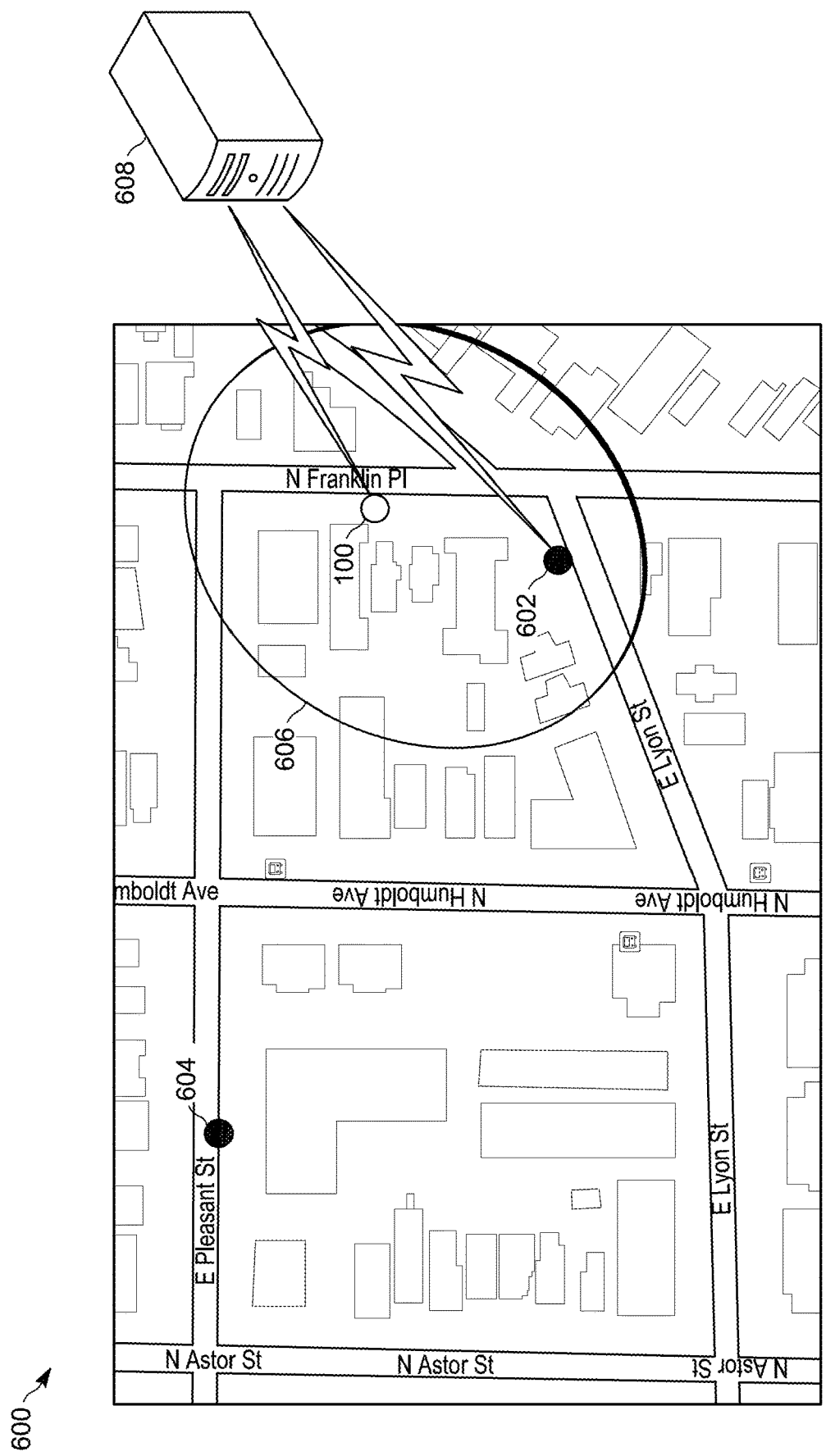
FIG. 6 illustrates the portable electronic device of FIG. 1 operating in a geographical area according to some embodiments.

FIG. 6 illustrates a geographic area 600 in which the portable electronic device 100 is located. In the illustrated example, a second portable electronic device 602 and a third portable electronic device 604 are also located within the area 600. When an incident (for example, the incident 300) occurs and the portable electronic device 100 executes the method 200, at block 212 the portable electronic device 100 transmits the classifier to one or more of an additional portable communication device within a predetermined distance of the portable electronic device 100. In the example illustrated in FIG. 4, the portable electronic device 100 may transmit the classifier to any portable electronic devices within a proximate area 606 (in this case, the second portable electronic device 602).

In some embodiments, transmitting the classifier to the second portable electronic device 602 further comprises the electronic processor 102 transmitting the classifier to a remote server 608. In some embodiments, the remote server 608 is a control center. In some embodiments, the remote server 608 is configured to transmit the classifier to the one or more additional portable electronic devices within the predetermined distance from the portable electronic device 100.

The remote server 608 is communicatively coupled to and accessible by the portable electronic device 100. In some embodiments, the remote server 608 is a server database housing. In alternative embodiments, the remote server 608 may be part of a cloud-based database system accessible by the portable electronic device 100 over one or more networks. The remote server 608 may be configured to communicate with one or more databases. Each database may include information identities of a plurality of known subjects (or POEs). In some embodiments, the remote server 608 use the classifier received by the portable electronic device 100 to identify a particular known subject. Such information is then transmitted to the portable electronic device 100 as well as the portable electronic device(s) within the predetermined area (for example, area 606 of FIG. 4) of the portable electronic device 100. It should be understood that although only one remote server (remote server 608) is shown and described in the example embodiment, multiple remote servers could be implemented in alternative embodiments.

In some embodiments, the electronic processor 102 may perform only some of the edge learning process on the subject of interest and transmit the result to a remote server or device (for example, the remote server 608) so that the remote server or device creates the classifier or identifies the subject of interest by comparing the received images and process data to one or more subjects stored within the databases.

In some embodiments, the electronic processor 102 is further configured to, after selecting the camera responsive to the incident (at block 204 of FIG. 2), capture an audio sample corresponding to the incident. In such an embodiment, the electronic processor 102 may be further configured to transmit the audio sample to either or both of the remote server 608 (see FIG. 6) and one or more portable electronic devices within the proximity of the portable electronic device 100 (for example, as illustrated in FIG. 6, the portable electronic device 602 within the proximate area 606).

Figure 7:
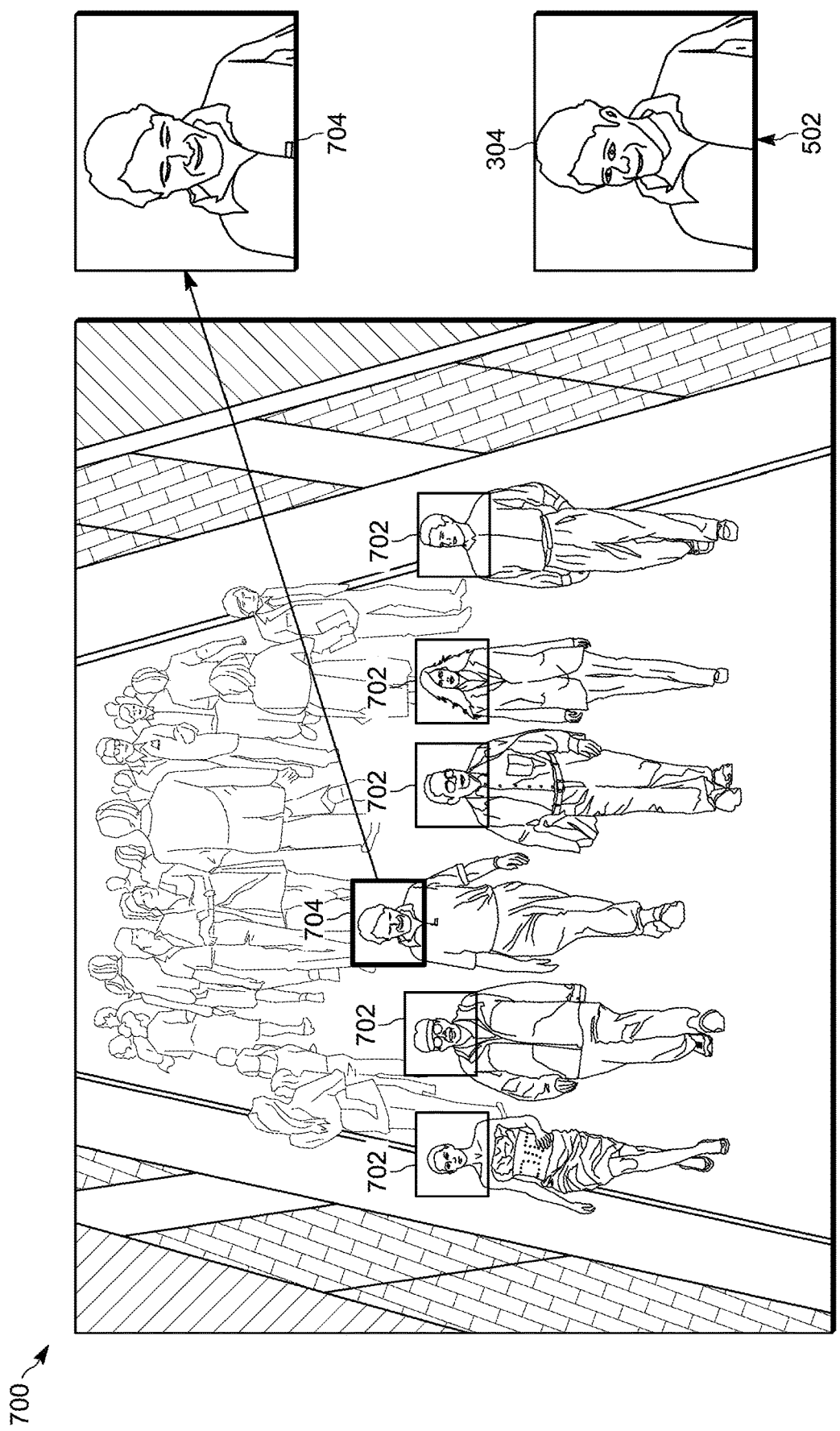
FIG. 7 is an example of an image captured by a second portable electronic device operating in the geographical area of FIG. 6 according to some embodiments.

Upon receiving the classifier from the portable electronic device 100, the second portable electronic device 602 may use the classifier to identify the subject of interest, for example, from one or more images captured by an image sensor of the second portable electronic device 602. FIG. 7 illustrates an example of an image 700 captured by the second portable electronic device 602. The second portable electronic device 602 may be configured to analyze the image 700 and identify one or more subjects of interest 702 within the image 700. The second portable electronic device 602 may then determine, based on the classifier, a potential subject of interest 704 from the subjects of interest 702. The second electronic processor may then compare features of the potential subject of interest 704 with the classifier to determine whether the potential subject of interest 704 is the subject of interest (for example, the second party 304). In some embodiments, the image 502 originally captured by the portable electronic device 100 may be presented on a graphic user interface of the second portable electronic device 602 so that a user of the second device 602 may compare the image 502 to the potential subject of interest 704 within the captured image 700.

It should be noted that a plurality of hardware and software based devices, as well as a plurality of different structural components may be utilized to implement the invention. In some embodiments, the invention provides a software application that is executable on a personal computing device, such as a smart phone, tablet computer, smart watch, a portable radio, a body-worn camera device, and the like. In some embodiments, the software application may be stored and executed by a remote computing device, such as a server. In particular, the software application may be executed by a server, and a user can access and interact with the software application using a recognition device. Also, in some embodiments, functionality provided by the software application as described above may be distributed between a software application executed by a user's portable communication device and a software application executed by another electronic process or device (for example, a server) external to the recognition device. For example, a user can execute a software application (for example, a mobile application) installed on his or her smart device, which is configured to communicate with another software application installed on a server.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A portable electronic device comprising:
a first camera;
a second camera;
an electronic processor; and
one or more sensors communicatively coupled to the electronic processor;
the electronic processor configured to
detect, based on information obtained from the one or more sensors, an incident, wherein the incident is at least one selected from the group consisting of removing the portable electronic device from a holster, dropping the portable electronic device from a predetermined height, and throwing the portable electronic device;
select, between the first camera and the second camera, a camera responsive to the incident;
capture an image using the selected camera;
determine, within the image, a subject of interest, wherein the subject of interest is at least one selected from the group consisting of a person, an object, and an entity;
initiate an edge learning process on the subject of interest to create a classifier for use in identifying the subject of interest; and
transmit the classifier to a second portable electronic device within a predetermined distance from the portable electronic device.

2. The portable electronic device of claim 1 wherein the one or more sensors includes an inertial gravitational sensor and wherein the electronic processor is further configured to detect, based on the inertial gravitational sensor, a motion indicative of a sudden movement based on a signal generated by the inertial gravitational sensor and wherein the camera responsive to the incident is selected based on the motion based on the signal received from the inertial gravitational sensor.

3. The portable electronic device of claim 1, wherein the electronic processor is further configured to differentiate between the incident and an accidental triggering.

4. The portable electronic device of claim 1, wherein the one or more sensors includes a microphone and wherein the electronic processor is further configured to, after selecting the camera responsive to the incident, capture, via the microphone, an audio sample corresponding to the incident.

5. The portable electronic device of claim 4, wherein the electronic processor is further configured to transmit the audio sample to at least one of a remote server and the second portable electronic device.

6. The portable electronic device of claim 1, wherein selecting one of the first camera or the second camera further includes determining which of the first camera and the second camera is angled in a substantially upward direction.

7. The portable electronic device of claim 1, wherein the electronic processor is further configured to:
during the edge learning process, determine if the subject of interest is a public safety personnel; and
in response to the subject of interest being a public safety personnel, terminate the edge learning process.

8. The portable electronic device of claim 1, wherein the electronic processor is further configured to:
determine, within the image, a second subject of interest;
initiate a second edge learning process on the second subject of interest to create a second classifier; and
transmit the second classifier to the second portable electronic device within the predetermined distance from the portable electronic device.

9. The portable electronic device of claim 1, wherein the electronic processor is further configured to terminate the edge learning process in response to at least one selected from the group consisting of the subject of interest is no longer present in a field of vision of the selected camera, a predetermined time period has passed, and the edge learning process exceeds a minimum learning threshold.

10. The portable electronic device of claim 1, wherein transmitting the classifier to the second portable electronic device further comprises transmitting the classifier to a remote server wherein the remote server is configured to transmit the classifier to the second portable electronic device within the predetermined distance from the portable electronic device.

11. An object learning method of a portable electronic device, the method comprising:
    detecting, based on information obtained from one or more sensors, an incident, wherein the incident is at least one selected from the group consisting of removing the portable electronic device from a holster, dropping the portable electronic device from a predetermined height, and throwing the portable electronic device;
    selecting, between a first camera and a second camera, a camera responsive to the incident;
    capturing an image using the selected camera;
    determining a subject of interest within the image, wherein the subject of interest is at least one selected from the group consisting of a person, an object, and an entity;
    initiating an edge learning process on the subject of interest to create a classifier for use in identifying the subject of interest; and
    transmitting the classifier to a second portable electronic device within a predetermined distance from the portable electronic device.

12. The method of claim 11 wherein the one or more sensors includes an inertial gravitational sensor and wherein the method further comprising detecting, based on the inertial gravitational sensor, a motion indicative of a sudden movement based on a signal generated by the inertial gravitational sensor and wherein the camera responsive to the incident is selected based on the motion based on the signal received from the inertial gravitational sensor.

13. The method of claim 11, the method further comprising differentiating between the incident and an accidental triggering.

14. The method of claim 11, wherein the one or more sensors includes a microphone and wherein the method further includes, after selecting the camera responsive to the incident, capturing, via the microphone, an audio sample corresponding to the incident.

15. The method of claim 14, the method further comprising transmitting the audio sample to at least one of a remote server and the second portable electronic device.

16. The method of claim 11, the method further comprising
    during the edge learning process, determining if the subject of interest is a public safety personnel, and
    in response to the subject of interest being a public safety personnel, terminating the edge learning process.

17. The method of claim 11, the method further comprising:
    determining, within the image, a second subject of interest;
    initiating a second edge learning process on the second subject of interest to create a second classifier; and
    transmitting the second classifier to the second portable electronic device within the predetermined distance from the portable electronic device.

18. The method of claim 11 further comprising terminating the edge learning process in response to at least one selected from the group consisting of the subject of interest is no longer present in a field of vision of the selected camera, a predetermined time period has passed, and the edge learning process exceeds a minimum learning threshold.

19. The method of claim 11, wherein selecting one of the first camera or the second camera further includes determining which of the first camera and the second camera is angled in a substantially upward direction.

20. The method of claim 11, wherein transmitting the classifier to the second portable electronic device further comprises transmitting the classifier to a remote server wherein the remote server is configured to transmit the classifier to the second portable electronic device within the predetermined distance from the portable electronic device.

* * * * *